United States Patent [19]

Milner

[11] 4,084,837
[45] Apr. 18, 1978

[54] WHEEL SUSPENSION FOR MOTOR VEHICLES

[75] Inventor: Peter James Milner, Rugby, England

[73] Assignee: Volkswagenwerk Aktiengesellschaft, Wolfsburg, Germany

[21] Appl. No.: 593,178

[22] Filed: Jul. 3, 1975

[30] Foreign Application Priority Data

Jul. 12, 1974 Germany ............................ 2433583

[51] Int. Cl.² .......................................... B62D 17/00
[52] U.S. Cl. ................................ 280/668; 267/63 R; 280/691
[58] Field of Search ............... 280/661, 668, 663, 666, 280/667, 691, 693, 696, 671, 701; 267/63

[56] References Cited

U.S. PATENT DOCUMENTS

| 2,907,578 | 10/1959 | Taber ................................ 180/73 R |
| 2,992,015 | 7/1961 | Halford et al. .................. 280/668 X |
| 3,037,787 | 6/1962 | Gottschald ........................... 280/668 |
| 3,115,349 | 12/1963 | Lerg ..................................... 280/667 |
| 3,257,121 | 6/1966 | Muller .................................. 280/661 |
| 3,279,782 | 10/1966 | Schick ................................. 280/668 |
| 3,430,977 | 3/1969 | Riehl ................................... 280/693 |
| 3,490,785 | 1/1970 | Moss .................................... 280/668 |
| 3,589,701 | 6/1971 | Gee ..................................... 267/64 R |
| 3,677,535 | 7/1972 | Beck ....................................... 267/63 |
| 3,703,215 | 11/1972 | Takahashi ........................... 280/668 |
| 3,942,815 | 3/1976 | Schwenk .............................. 280/675 |

FOREIGN PATENT DOCUMENTS

| 569,935 | 1/1959 | Belgium ............................... 280/668 |
| 717,515 | 1/1942 | Germany ............................. 280/671 |
| 1,178,719 | 9/1964 | Germany ............................. 280/661 |

*Primary Examiner*—Joseph F. Peters, Jr.
*Assistant Examiner*—Jack D. Rubenstein
*Attorney, Agent, or Firm*—Spencer & Kaye

[57] ABSTRACT

A suspension for a steerable wheel of a motor vehicle includes articulating components for movably attaching the wheel to the vehicle chassis. The articulating components comprise a resilient support arrangement significantly yielding to lateral forces for effecting a low rigidity of the camber angle.

5 Claims, 3 Drawing Figures

WHEEL SUSPENSION FOR MOTOR VEHICLES

BACKGROUND OF THE INVENTION

This invention relates to an individual wheel suspension for motor vehicles and is of the type in which the steered vehicle wheels are articulated to the vehicle chassis by means of control arms and/or wheel guiding shock absorbers.

In motor vehicles axles of present-day construction which are associated with steered vehicle wheels, very frequently an undesirable steering instability occurs which may have widely varying reasons. Thus, it is for example known that a wheel which is out-of-round, or unbalanced or rolls over a hump or the like, generates a torque about the steering axis (king pin axis) which leads to a shimmy or wobble of the steered wheel. This effect is described in a book by Heider, entitled KRAFTFAHRZEUGLENKUNG, pp. 226–229, VEB-Verlag Technik, 1970, and in the periodical ATZ, Issue 10, October 1959, pp. 296–297.

The above-outlined instability of the steered wheels is conventionally attempted to be eliminated or at least diminished by steering shock absorbers, by a careful balancing and centering of the wheels and by a deliberate increase in the friction between the steering and the axle.

SUMMARY OF THE INVENTION

It is an object of the invention to provide an individual wheel suspension of the above-outlined type by means of which particularly that component of the steering instability which is generated by shimmy or wobble caused by out-of-round or unbalanced wheels is eliminated or at least reduced without increasing the friction and thus adversely affecting the steering or without taking separate measures to ensure a true circular wheel motion.

This object and others to become apparent as the specification progresses, are accomplished by the invention, according to which, briefly stated, an articulation of the wheel to the chassis is effected by an elastic support which is significantly yielding to lateral forces to effect a low stiffness of the camber angle for reducing the steering instability.

According to a further development of the invention, the individual wheel suspension has a wheel guiding shock absorber movably connected in its upper zone with the vehicle chassis and, in its lower zone rigidly coupled to a wheel carrier. The latter is articulated to the chassis by a control arm. The upper shock absorber support is designed to be significantly yielding to lateral forces. The upper shock absorber support is preferably formed by a rubber spring unit which is designed and arranged in such a manner that it is exposed at least approximately exclusively to compression by the forces generated by the load on the axle and it is exposed exclusively to shear by lateral forces.

In a further development of the invention the rubber spring unit is designed as a rubber ring, the downwardly oriented radial face of which is in engagement with the shock absorber and the upwardly oriented radial face of which is in engagement with the vehicle chassis and further, the wall thickness of the rubber ring measured in the radial direction is smaller than the height of the rubber ring measured axially. In a further advantageous embodiment of the invention the rubber spring unit is arranged in such a manner that its central axis passes through the point of intersection between the central radial wheel plane and the imaginary extension of the control arm.

The individual wheel suspension structured according to the invention takes advantage of a known phenomenon, according to which where a deflection of the wheel is coupled with a change in the camber, such camber change of the rotating wheel generates a gyroscopic torque about the king pin or ball joint axis (also referred to as steering axis). In this connection reference is made to the same issue of the periodical mentioned above, pages 300 and 301, as well as to the same book, pages 230-237. The recognition that this gyroscopic torque acts about the ball joint axis in opposition to the torque which causes a wheel shimmy because of an out-of-round and/or unbalanced wheel led to the resilient support structure which, according to the invention, significantly yields to lateral forces. Thus, the vertical forces caused by an out-of-round and/or unbalanced wheel effect an elastic change of the camber angle by a lateral shift of the articulation point of the shock absorber or, as the case may be, of the control arm. By correspondingly dimensioning the lateral elasticity of the support of the articulation, that component of the shimmy which is generated because of an out-of-round and/or unbalanced wheel may be reduced or even entirely eliminated.

BRIEF DESCRIPTION OF THE DRAWINGS

FIG. 3 is the same illustration as in FIG. 1 showing additional scalar and vectorial magnitudes.

DESCRIPTION OF THE PREFERRED EMBODIMENT

Figure 1:
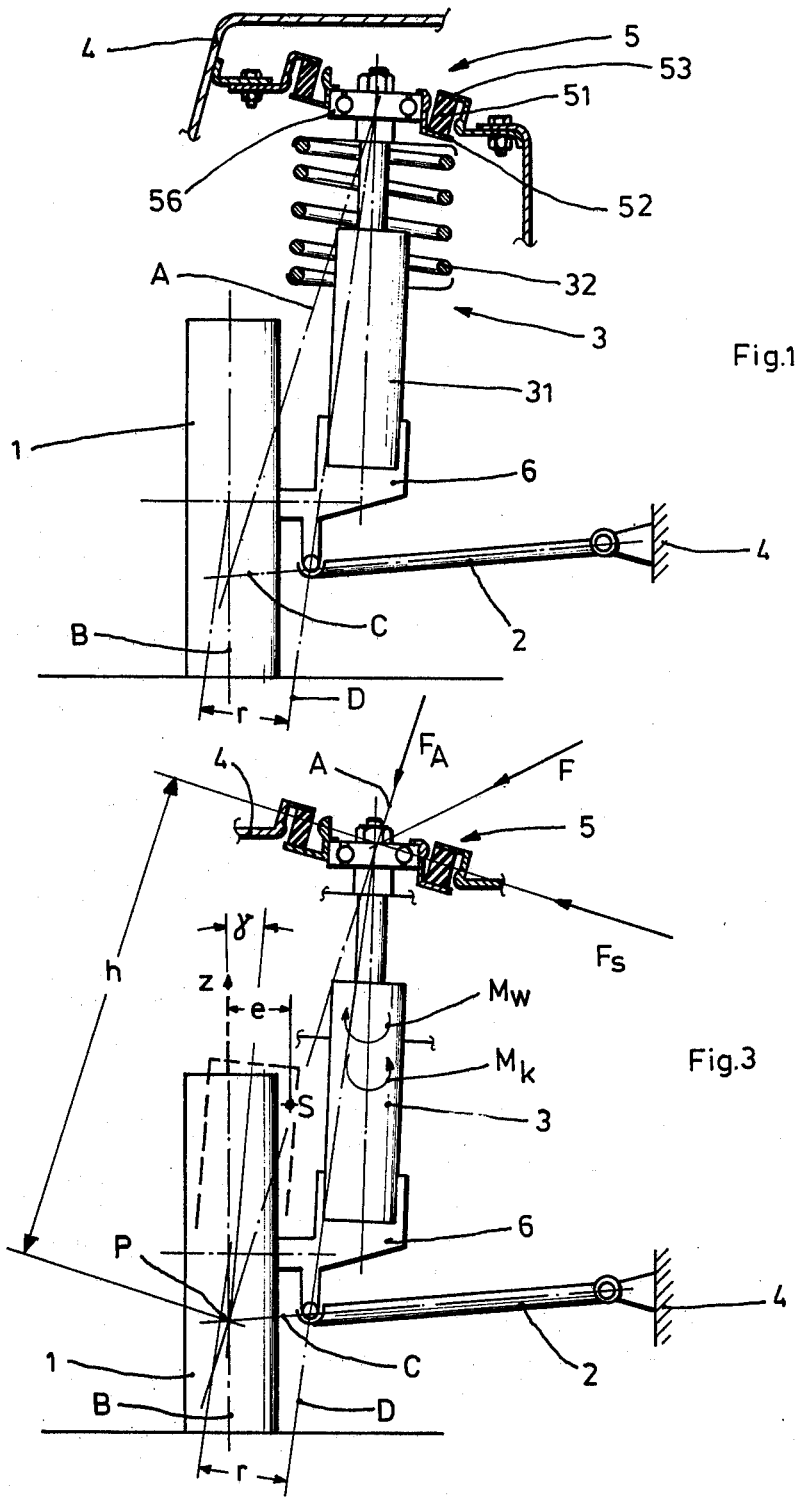
FIG. 1 is a schematic front elevational view, partially in section, of a steered vehicle wheel suspension incorporating a preferred embodiment of the invention.

Turning now to FIG. 1, the steered wheel 1 of a vehicle is articulated to an only symbolically shown vehicle chassis 4 by a wheel guiding spring strut 3 and a lower control arm 2. The spring strut 3 which is formed of a shock absorber 31 and a coil spring 32 is movably connected at its upper end with the vehicle chassis 4 by means of an elastic support 5. At its lower end, the spring strut 3 is movably connected with the control arm 2. The vehicle wheel 1 is secured rigidly to the spring strut 3 by means of a wheel carrier 6. According to the invention, the upper elastic spring strut support 5 is designed to be significantly yielding to lateral forces so that there is obtained a low rigidity of the camber angle, whereby the steering instability is reduced.

Figure 2:
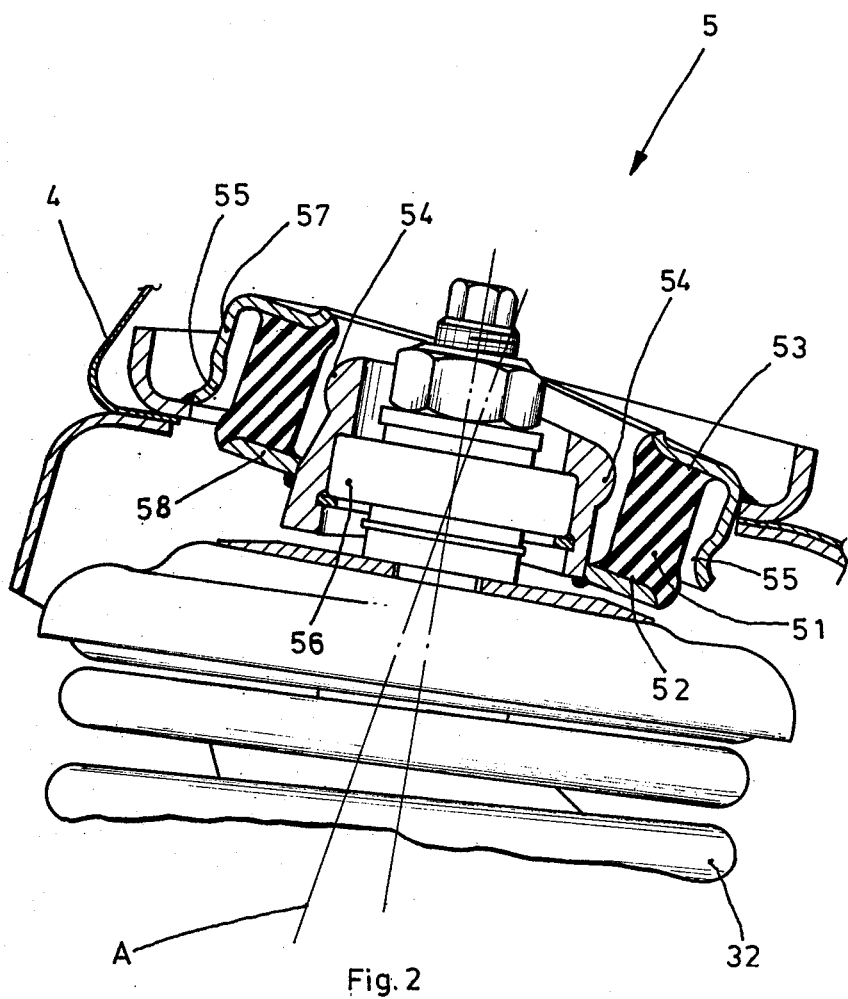
FIG. 2 is a transverse sectional view, on an enlarged scale, of one part of the suspension shown in FIG. 1.

Also referring to FIG. 2, the support 5 is formed of a rubber spring unit constituted by a rubber ring 51. The lower (that is, downwardly oriented) end face 52 of the rubber ring 51 is in engagement with the spring strut 3, while the upper (that is, upwardly oriented) end face 53 of the rubber ring 51 is in engagement with the vehicle chassis 4. More specifically, the end face 53 engages a collar-like upper support plate 57 which is affixed to the chassis 4 and the end face 52 contacts a disc-like lower support plate 58 which is connected with a ball bearing 56 mounted on the spring leg axle. The wall thickness of the rubber ring 51 (that is, its dimension measured in the radial direction) is smaller than its height (that is, its dimension measured in the axial direction) to ensure an articulation which significantly yields to lateral forces. In order to ensure the desired spring stiffness, it is advantageous to design the support 5 in such a manner that the rubber ring 51 is exposed exclusively to compression (hard) by vertical forces, that is, particularly by the forces generated by the load on the axle and is exposed exclusively to shear (soft) by the camber torques. Thus, in the embodiment illustrated, the rubber ring 51 is arranged in such a manner that its central axis A extends through the intersection between the central wheel plane B and the extension C of the control arm 2. By means of these structural measures there is achieved the desired low stiffness of the camber angle. It is noted that this camber angle stiffness may be as low as about 25% of the camber angle stiffness in conventional structures.

By way of example it is noted that in a vehicle weighing approximately 1000 kg, a rubber ring having, in its free state, an outer diameter of 80 mm, an inner diameter of 56 mm, a height of 25 mm and a hardness of 45°–50° Shore was found to perform in a very satisfactory manner, achieving a substantial reduction of the shimmy caused by an out-of-round or unbalanced wheel.

In general, the desired low camber stiffness applies only for a limited deflection (approximately 2 to 3 mm) of the elastic support. For limiting the transverse motion of the upper spring strut support 5, there are therefore provided lateral stops 54 and 55 which may be well observed in FIG. 2. The stop 55 is constituted by an inwardly oriented circumferential protuberance of the support plate 57. The stop 55 which thus faces the axis of the spring strut 3 is situated externally of, and at a small distance from, the lower zone of the outer periphery of the rubber ring 51. The stop 54 which is constituted by an outwardly oriented circumferential projection on a thimble member secured to the upper end of the spring strut 3, is situated internally of, and at a small distance from, the upper zone of the inner periphery of the rubber ring 51. It is seen that after a certain lateral deflection of the upper spring strut support, the lateral stop 54 abuts the inner face of the rubber ring 51 and the lateral stop 55 abuts the outer face of the rubber ring 51. The above-described desired yield of the support 5 to lateral forces is thus effective only as long as the rubber ring 51 has not yet reached (contacted) the two lateral stops 55 and 54, respectively.

Turning now to FIG. 3, there is illustrated the functioning of the individual wheel suspension designed according to the invention. As it has already been explained above, it is known that an out-of-round and/or unbalanced wheel or the travel of a wheel over a surface irregularity leads to a shimmy or wobble in the steering. The occurrence of this phenomenon finds explanation in the fact that due to the above-described occurrences there is effected a change in the dynamic rolling radius of the wheel, whereby necessarily the rpm or angular velocity of the wheel also varies while the vehicle travels with constant speed. Thus, because of the inertia of the wheel, there is generated a torque about the king pin axis which, in the embodiment illustrated, is the steering axis D. Assuming a constant forward velocity V of the wheel center and a vertical oscillation $z = Z \cdot \sin\omega t$ caused by an out-of-round and/or unbalanced wheel, while taking into account the relationships $V = R \cdot \omega$ and $T \cdot R = \theta \cdot \dot\omega$, the shimmy or wobble moment $M_w$ generated by a force T imparted on the wheel center can be expressed by $$M_w = T \cdot r = \frac{\theta \cdot Z \cdot \omega^2 \cdot r}{R^2} \cdot \cos\omega t,$$

wherein $\theta$ is the moment of inertia of the wheel about the axis of rotation;

Z is the amplitude of the vertical oscillation of the wheel caused by an out-of-round or unbalanced wheel, or its passing over a surface irregularity;

$\omega$ is the angular velocity of the wheel;

$\dot\omega$ is the angular acceleration of the wheel;

R is the mean dynamic rolling radius of the wheel; and r is the effective lever arm of the force T affecting the wheel center in a direction perpendicular to the plane of the drawing (that is, in a direction parallel to the direction of travel of the motor vehicle).

The wobble moment is considered positive if it acts in the direction of toe in.

By virtue of the deliberate design of the upper spring leg support 5 so as to significantly yield to lateral forces, the vertical oscillations of the unsprung masses caused by an unbalanced or out-of-round wheel cause a variation of the camber angle $\gamma$ in response to the lateral excursion of the upper spring leg support. From the torque equation (about point P)

$$m \cdot \ddot z \cdot e - F_s \cdot h = 0,$$

there is obtained for the change of the camber angle with respect to time (camber angular velocity), by taking into account $F_s \approx C_s \cdot h \cdot \gamma$, $$\dot\gamma = -\frac{m \cdot Z \cdot \omega^3 \cdot e}{C_s \cdot h^2} \cdot \cos\omega t.$$

The camber angle variation $\dot\gamma$, which also means a variation of the rotary axis of the rotating vehicle wheel, generates, according to the gyroscopic laws, a gyroscopic torque $M_k$ effective about the steering axis D. This gyroscopic torque, which is considered positive if it works in the direction of toe in, is determined by means of the following relationships:

$$M_k = \theta \cdot \omega \cdot \dot\gamma = -\frac{m \cdot \theta \cdot \omega^4 \cdot Z \cdot e}{C_s \cdot h^2} \cdot \cos\omega t,$$

wherein m is the mass of the unsprung masses;

$\theta$ is the moment of inertia of the wheel about the axis of rotation;

$\omega$ is the angular velocity of the wheel;

Z is the amplitude of the vertical deflection of the wheel caused by an out-of-round or unbalanced wheel;

e is the horizontal distance of the center of gravity S of the unsprung masses from the central wheel plane B in which lies the point P;

$C_s$ is the spring stiffness, in the lateral direction, of the upper spring strut support;

h is the distance of the point P (which is the intersection between the central wheel plane B and the extension C of the control arm 2) from the point of attack of the lateral force component $F_s$ at the upper spring strut support 5.

As it may be observed from FIG. 3, for the formulation of the above-given torque equation, the force F of the chassis acting on the top of the spring strut 3 has been resolved into a force component $F_A$ passing through the point P and a force $F_S$ oriented perpendicularly thereto.

A comparison between the wobble torque $M_w$ and the gyroscopic torque $M_k$ shows that both torques are in phase (factor $\cos\omega t$) but are oppositely oriented. With a proper dimensioning of the individual factors they can therefore be caused to mutually cancel one another. The steering instability, that is, the wobble caused by an unbalanced and/or out-of-round wheel could therefore be rendered at least approximately ineffective if for a spring stiffness $C_s$ of the upper spring strut support 5 the value $$C_s = \frac{m \cdot R^2 \cdot \omega^2 \cdot e}{r \cdot h^2} = \frac{m \cdot V^2 \cdot e}{r \cdot h^2}$$

is selected. For the value V that speed should be inserted at which the wobble is the strongest. It is to be understood that the elasticity of the spring strut itself has to be taken into account.

The individual wheel suspension designed according to the invention has the significant advantage that a reduction in the steering instability is accomplished without resorting to a solution which would adversely affect the steering, such as by increasing the friction or the like. Further, by adopting the measures according to the invention, greater tolerances concerning wheel imbalance or wheel eccentricity are admissible.

The invention was explained above in connection with an embodiment involving a wheel guiding spring strut. It is to be noted, however, that the invention is not limited to such an arrangement. It is apparent that it may find use in other axle arrangements as well, for example, where axles articulated by dual control arms are used. The essential feature is that the articulation of the control arms has to be such that it significantly yields to lateral forces, so that the vertical oscillations of the vehicle wheels caused by an out-of-round and/or unbalanced wheel can effect an elastic change of the camber angle. In such a case, for the camber angle stiffness $C_\gamma$ there is selected the approximate value of $$C_\gamma = \frac{m \cdot V^2 \cdot e}{r}.$$

It will be understood that the above description of the present invention is susceptible to various modifications, changes and adaptations, and the same are intended to be comprehended within the meaning and range of equivalents of the appended claims.

What is claimed is:

1. In a suspension for a steerable wheel of a motor vehicle having a chassis, wherein the suspension includes a wheel guiding shock absorber having a lower end and an upper end; a wheel carrier rigidly attached to the lower end of the shock absorber; a control arm coupling the wheel carrier to the chassis; and an upper support including a rubber spring unit resiliently connecting the upper end of the shock absorber to the chassis, the improvement wherein said rubber spring unit is constituted by a rubber ring formed of a rubber wall having a thickness less than its height; said wall having upwardly and downwardly oriented end faces; said chassis being in engagement with said rubber ring exclusively at said upwardly oriented end face and said shock absorber being in engagement with said rubber ring exclusively at said downwardly oriented end face for exposing said rubber ring at least approximately exclusively to compression effected by the force generated by the load on the wheel and to be exposed exclusively to shear by lateral forces; said rubber ring yielding more to said lateral forces than to the compression forces generated by the load on the wheel for effecting a low rigidity of the camber angle.

2. A suspension as defined in claim 1, wherein said rubber spring unit is so dimensioned that for a camber angle rigidity $C_\gamma$ at least approximately the equation $$C_\gamma = \frac{m \cdot V^2 \cdot e}{r}$$

applies, wherein $m$ is the mass of the unsprung masses, V is the vehicle velocity, $e$ is the horizontal distance of the center of gravity of the unsprung masses from the central wheel plane and $r$ is the effective lever arm of the force affecting the wheel center in a direction parallel to the direction of travel of the motor vehicle.

3. A suspension as defined in claim 1, further comprising lateral stops positioned adjacent to and normally spaced from said rubber wall for abutting the same upon a predetermined lateral shift of said upper support for limiting the lateral displacement thereof.

4. A suspension as defined in claim 1, wherein said rubber ring has a central axis which extends through the point of intersection between the central radial plane of the wheel and the imaginary extension of said control arm.

5. A suspension as defined in claim 1, wherein said upper support is so dimensioned that for a spring stiffness $C_s$ at least approximately the equation $$C_s = \frac{m \cdot V^2 e}{r \cdot h^2}$$

applies, wherein $m$ is the mass of the unsprung masses, V is the vehicle velocity, $e$ is the horizontal distance of the center of gravity of the unsprung masses from the central wheel plane, $r$ is the effective lever arm of the force affecting the wheel center in a direction parallel to the direction of travel of the motor vehicle and $h$ is the distance from the intersection between the central wheel plane and the extension of the control arm to the point of attack of the lateral force component at the upper spring strut support.

* * * * *